United States Patent [19]

Dobry

[11] 3,878,184

[45] Apr. 15, 1975

[54] MONELLIN RECOVERY USING CARBOXYMETHYL CELLULOSE

[75] Inventor: Reuven Dobry, Stamford, Conn.

[73] Assignee: Beech-Nut, Inc., New York, N.Y.

[22] Filed: Feb. 26, 1973

[21] Appl. No.: 335,620

[52] U.S. Cl............... 260/112 R; 426/212; 426/217
[51] Int. Cl............................. A23j 1/14; A23l 1/26
[58] Field of Search.................. 260/112 R; 426/217

[56] References Cited
UNITED STATES PATENTS
3,687,693   8/1972   Essiet..................................... 99/141

OTHER PUBLICATIONS

J. of American Chem. Society, Vol. 78, 1956, pp. 751–755, Peterson et al.
A Cab. Manual of Analytical Methods of Protein Chemistry, Vol. I, 1960, Alexander et al., pp. 67, 76–77.
The Proteins, Vol. III, 1965, Neurath pp. 14–22.

FEBS Letters, March, 1972, Vol. 21, No. 1, pp. 88–90, Van der Wel.
Biochimica et Biophysica ACTA, January, 1972, Morris et al., pp. 114–121.

*Primary Examiner*—Howard E. Schain
*Attorney, Agent, or Firm*—Lawrence S. Levinson; Merle J. Smith

[57] ABSTRACT

Monellin, the sweet tasting principle of Serendipity berries, is recovered by the following process:
1. Clusters of berries: stems, skins, seeds and all are macerated.
2. The macerated berry clusters are extracted with water at about ambient temperature employing from about 3 to about 8 weight units of water per unit weight of berry clusters.
3. Insoluble matter is separated by centrifugation.
4. The clarified extract is contacted with carboxymethyl cellulose free acid.

12 Claims, No Drawings

MONELLIN RECOVERY USING CARBOXYMETHYL CELLULOSE

BACKGROUND OF THE INVENTION

The plant *Dioscoreophyllum cumminsii* is indigenous to central Africa, from Guinea to the Congo, and from the Sudan to Southern Rhodesia. Its hairy climbing vines grow in thick forest areas during the rainy season, from July to October, producing fruit known as the Serendipity berry. The berries are red, approximately ½ inch in diameter, growing in grapelike clusters, approximately 50–100 berries in each bunch.

Each Serendipity berry consists of a tough red-colored outer skin, a white mucilaginous flesh, and a friable thorny seed. Most, if not all of the Monellin, a material having an intense sweet taste, is located in the fleshy part of the berry. Since the skin contains undesirable pigments and the seed contains an intensely bitter principle, every effort has been made in the past to separate skins and/or seeds from the berries before extraction, or at least to avoid damaging them in the process. The extract so prepared was then subjected to a long series of time-consuming, tedious purification steps which are suitable for laboratory operations, but not feasible for commercial operation.

OBJECTS OF THE INVENTION

It is, accordingly, an object of the present invention to provide an improved, simplified process for the recovery of Monellin in a useful form from the fruit of the plant *Dioscoreophyllum cumminsii*. Another object is to provide a method for obtaining Monellin in more concentrated form in relatively few steps. Still another object is to provide a commercially feasible process for the recovery of Monellin. These and other objects of the present invention will be apparent from the following description.

SUMMARY OF THE INVENTION

Monellin, the sweet tasting principle of Serendipity berries is recovered by the following steps:
1. Clusters of berries: stems, skins, seeds and all are macerated.
2. The macerated berry clusters are extracted with water at about ambient temperature employing from about 3 to about 8 weight units of water per unit weight of berry clusters. Preferably the water is acidified to a pH of from about 3 to about 5.
3. Insoluble matter is separated by centrifugation.
4. The clarified extract is contacted with carboxymethyl cellulose free acid.

DETAILED DESCRIPTION

It has been found that Monellin, the sweet tasting principle of the Serendipity berry, is brought from its native state in the berry to a useable semi-pure preparation by a process comprising the following steps:
1. Whole berry clusters: including stems, skins, seeds and all are macerated.
2. The macerated berry clusters are extracted with water at about ambient temperature employing from about 3 to about 8 weight units of water per unit weight of berry clusters. Preferably the water is acidified to a pH of from about 3 to about 5.
3. Insoluble matter is separated by centrifugation.
4. The clarified extract is contacted with carboxymethyl cellulose free acid. The semi-pure preparation can be used as is or can serve as starting material for subsequent refinement of Monellin to absolute purity.

Comminution of the clusters of whole berries may be carried out by any means suitable to macerate the clusters, e.g. to a particle size of from about 0.5 mm to about 1.0 mm.

The comminuted berry clusters are then added to from about 3 to about 8 weight units of water per unit weight of comminuted berry clusters with agitation for from about 10 minutes to about 1 hour. The water may be adjusted to a pH of from about 3 to about 5 or the pH of the water may be adjusted to the foregoing range following agitation to promote flocculation of colloidal matter and clarification of the extract. Insoluble matter is then separated by centrifugation until the clarified extract is slightly hazy and pinkish in color, having a taste which is both bitter and sweet. Preferably a two-stage centrifugation is employed wherein coarse solids are removed in the first stage and fine solids are removed in the second stage. Other separatory methods which may be used are, for example, settling, or mechanical separation, e.g. fine screening, filtration and the like.

The clarified extract is then contacted with fine (−80 mesh) carboxymethylcellulose (CMC) free acid. This material is a white granular powder derived from the sodium salt of CMC. Since it is an acid and not the sodium salt, it is completely insoluble in water. This material is obtainable from Hercules Powder Co., Wilmington, Del. under the tradename "Hercules CMC Free Acid." Contacting the clarified extract with the CMC free acid serves to adsorb the Monellin on the CMC free acid. The CMC free acid may be employed in either a fine or coarse particle size, either in its "native" state as the free acid or partly neutralized with a base. A fine particle size is one that will pass through an 80 mesh screen whereas a coarse particle size is one that will be retained on a 50 mesh screen. The CMC free acid containing the adsorbed Monellin may be used as such as a sweetening agent, especially if it is fine enough and therefore not gritty in the mouth, or as an intermediate for further purification of Monellin.

The contacting between extract and adsorbent may take place by passing the clarified extract through a column containing neutralized CMC free acid or by agitating a mixture of the clarified extract and the CMC free acid. After having adsorbed Monellin from the clarified extract the CMC free acid is washed with water having a pH of from about 3 to about 5 in order to displace any unadsorbed colloidal matter, color bodies and bitter-tasting ingredients. The CMC free acid containing adsorbed Monellin is then dried to yield a material having an intensely sweet taste.

A liquid sweetening preparation may be prepared by contacting the CMC free acid containing adsorbed Monellin with any buffer or basic solution which will adjust the pH to about 5 or above, preferably from about 7 to about 10. By such treatment the Monellin is desorbed from the CMC free acid. Filtration of the resulting slurry produces a liquid concentrate free of adsorbent which resembles molasses in color, sweetness and viscosity. The liquid concentrate may be used as such as a sweetening agent. When the Monellin has been desorbed from the CMC free acid by means of buffer solutions rather than alkali or ammonia, the liquid concentrate may be treated to remove mineral salts, for example by dialysis and either dried to yield a more purified extremely sweet product or the dialyzed concentrate may be further concentrated by ultra filtration to yield a highly concentrated liquid sweetening agent.

While desorption of Monellin from the CMC free acid takes place at a pH of 5 or above the desorption is more efficient at higher pH's and is accomplished with a smaller volume of eluant.

All mesh sizes referred to in the foregoing application refer to the US standard mesh series.

The Monellin prepared according to the present invention either adsorbed on CMC free acid or desorbed therefrom or in the form of concentrated liquids may be used to impart their sweetness to a variety of comestibles including food products, liquids, and pharmaceutical preparations. Examples of such food products are fruits, vegetables, juices, meat products such as ham or bacon, sweetened milk products, egg products, salad dressings, ice creams and sherbets, icings, syrups, cake mixes, pastry mixtures, gelatin, chewing gum, and candy. Liquids include beverages such as carbonated and noncarbonated solf drinks, wines and liqueurs.

Examples of pharmaceutical preparations are orally administered suspensions of antibiotics, e.g., penicillin, ampicillin, nystatin or oxytetracycline; liquid vitamin preparations; and syrups, e.g., cough syrup; tooth paste; mouth wash; etc.

The compositions of the present invention are stable, water-soluble compositions which may be utilized under various physical forms, for example, as powders, liquids or pastes. They may also be used with liquid or solid carriers such as water, glycerin, sorbitol, starch, salt, citric acid or other appropriate pharmaceutically acceptable non-toxic carriers. The compositions may also be used in combinations with other sweetening agents such as sugar especially sucrose and artificial sweeteners such as saccharin and the pharmaceutically acceptable alkali metal, ammonium, alkaline earth metal or amine salts, e.g., N-methylglucamine salt, thereof.

The following examples illustrate the present invention without, however, limiting the same thereto. All mesh sizes in the following examples refer to US standard screen mesh sizes.

EXAMPLE 1

40 Pounds of frozen whole berry clusters freshly rinsed with tap water and allowed to drain are macerated in a motorized meat grinder at a fine setting. The ground berries are added to 28 gallons of water and agitated for 30 minutes. The pH of the resulting slurry is adjusted to 4.2 with concentrated HCl and insoluble matter is separated by a 2-stage centrifugation: Sharples Super-D-Canter continuous centrifuge (screw conveyor type) followed by Sharples super centrifuge (tubular bowl type). The clarified extract is slightly hazy and pinkish in color being both bitter and sweet to the taste.

Fine (−80 mesh) CMC free acid is slurried in water and neutralized to pH 6.0 by dropwise addition of 2.7 ml of 1N NaOH per gram of dry CMC. A glass column, measuring 30 mm outside diameter and 400 mm in length is wet-filled with the neutralized CMC adsorbent to a height of 55 mm and about 1400 ml of the clarified extract are passed downward through the column. By the time all of the primary extract is fed to the column, the adsorbent is visibly loaded to a depth of 20 mm, as indicated by a change in color, and remains in that condition after a rinse with water acidified to pH 4.2. The column is then drained and its contents extruded by a moderate back-pressure of compressed air. The loaded segment of the adsorbent is carefully sliced off with a sharp knife, dried in vacuo, and pulverized by a mortar and pestle. The final material is a light fluffy solid, reddish-brown in color and intensely sweet when placed in the mouth.

EXAMPLE 2

The procedure of example 1 is followed except that the loaded segment of the adsorbent after being removed from the remainder of the column is slurried in a small amount of water and titrated with aqua ammonia to pH 10. Filtration of this slurry produces a liquid concentrate free of adsorbent and resembling molasses in color, sweetness and viscosity.

EXAMPLE 3

About 2000 ml of clarified extract obtained according to the first paragraph of example 1 are passed through a glass column having the same dimensions as in example 1 which is loaded with coarse CMC free acid (having a particle size such that substantially all is retained on a No. 50 mesh screen) to a height of 240 mm. The adsorbent is prepared by neutralizing CMC free acid with aqua ammonia to pH 7.0, and storing the neutralized product moist under refrigeration until use. Following adsorption the column is rinsed with water having a pH of 4.2. The column is then eluted with 0.1 M phosphate buffer at pH 9.5 and the Monellin collected as a liquid concentrate. It is similar in taste and appearance to the liquid concentrate of example 2 except for an accompanying salinity due to phosphate ion.

EXAMPLE 4

About 18 g of coarse (+50 mesh) dry CMC free acid, not neutralized with base, are slurried in water and allowed to stand for several hours until fully swollen. The CMC free acid is then drained, added to 420 ml of clarified extract having a pH of 4.0 and agitated for 30 minutes. The CMC free acid is separated from the spent extract by settling and the supernate decanted with care. This procedure is repeated 6 times adding 420 ml of clarified extract to the CMC free acid each time until the adsorbent is dark in color and essentially no longer able to pick up sweetness from the extract. The adsorbent is then rinsed with several volumes of water which has been acidified with citric acid to pH 4.0. The rinsed adsorbent is titrated with 1 M sodium carbonate until the pH reaches 9.0. Separation of the liquid from the solid yields a liquid concentrate similar to that of examples 2 and 3. Aliquots of this liquid are reacidified to pH 5.0, adsorbed on fine (−80 mesh) CMC, washed with an acetone mixture (4:1), vacuum dried and pulverized. The dried product is lighter in color than the final product of example 1.

EXAMPLE 5

The procedure of example 4 is repeated except that the CMC free acid is separated from the spent clarified extract by being retained on a 50 mesh screen. The liquid concentrate obtained upon the desorption of Monellin, is dialyzed to remove mineral salts and then divided into 2 parts. The first part is treated with 4 volumes of acetone to form a light fluffy precipitate which when separated, dried and pulverized, yields Monellin as a fine, off-white powder which, while not entirely pure, is extremely sweet. The second part of the dialyzed concentrate is further concentrated by ultra filtration in a hollow fiber device to form a highly concentrated honey or syrup colored liquid.

EXAMPLE 6

Three glass columns, measuring 30 mm inside diameter × 104 mm in length and equipped with a coarse fritted disc at the bottom, are filled with coarse CMC to a height of 65 mm and connected in series. About 10 liters of primary extract (about pH 4.0) are passed through the system until the first column is visibly saturated with color bodies. The system is then rinsed with one liter of 0.1 M sodium citrate buffer pH 4.0, and the first column removed from the sequence for elution. The entire cycle is then repeated with the original second column in the number one position, the original third column in the number two position, and a column of fresh CMC in the number three position. When several loaded columns are so prepared, they are eluted with 0.1 M sodium citrate under 3 varying pH conditions until the eluate has no detectable sweet taste.

| Fraction | pH | Volume | Color | Taste |
| --- | --- | --- | --- | --- |
| A | 5.0 | 412 ml | Lt. Amber | Sour-sweet |
| B | 7.0 | 193 ml | Amber | Saline sweet |
| C | 10.0 | 154 ml | Amber | Saline sweet |

Fraction A is adjusted to pH 4.0, readsorbed on fine CMC, then dried and pulverized to produce Monellin in the adsorbed form. Fraction B is dialyzed, treated with acetone and the precipitated Monellin is dried to produce the free or unadsorbed form of "solid" Monellin. Fraction C is dialyzed and concentrated as in example 5 to produce Monellin "syrup."

EXAMPLE 7

To a conventional sugarless chewing gum base there is added 0.75% by weight of the product of example 1. The mixture is blended until uniform. The final product has a sweetness equivalent to but longer lasting than saccharin sweetened gum.

What is claimed is:

1. A method for obtaining the sweet tasting principle of *Dioscoreophyllum cumminsii* in useful form adsorbed on carboxymethylcellulose comprising contacting with carboxymethylcellulose free acid the soluble matter obtained by extracting macerated clusters of whole berries of *Dioscoreophyllum cumminsii* with water.

2. A method according to claim 1 wherein the macerated berry clusters are extracted with from about 3 to about 8 weight units of water per unit weight of macerated berry clusters.

3. A method according to claim 1 wherein the insoluble matter is separated by centrifugation.

4. A method for obtaining a liquid sweetening preparation from the sweet tasting principle of *Dioscoreophyllum cumminisii* adsorbed on carboxymethylcellulose according to claim 1 which comprises contacting the sweet tasting principle of *Dioscoreophyllum cumminsii* adsorbed on carboxymethylcellulose with an aqueous eluant at a pH of about 5 or above.

5. A method according to claim 4 wherein the pH is from about 7 to about 10.

6. A method according to claim 1 wherein the macerated berry clusters are extracted with water at about ambient temperature employing from about 3 to about 8 weight units of water per weight unit of berry clusters.

7. A method according to claim 6 wherein insoluble matter is separated from the extract before contacting the soluble matter with carboxymethylcellulose free acid.

8. A method according to claim 6 wherein the pH of the water is from about 3 to about 5.

9. A method according to claim 4 wherein the sweet tasting principle of *Dioscoreophyllum cumminsii* is adsorbed on carboxymethylcellulose by extracting macerated berry clusters of *Dioscorephyllum cumminsii* with water at about ambient temperature at a pH of from about 3 to about 5, the water being employed in a ratio of from about 3 to about 8 weights units per weight unit of berry clusters, and contacting the extract with carboxymethylcullulose free acid.

10. A method according to claim 9 wherein the sweet tasting principle of Dioscoreophyllum cumminsii adsorbed on carboxymethylcellulose is contacted with an aqueous eluant at a pH of from about 7 to about 10.

11. A method as in claim 1 comprising the additional step of contacting the product of claim 1 with a buffer or base effective to adjust the pH to about 5 or above.

12. A method according to claim 11 wherein the agent is effective to adjust the pH to from about 7 to about 10.

* * * * *